(12) United States Patent
Ide

(10) Patent No.: US 11,897,540 B2
(45) Date of Patent: *Feb. 13, 2024

(54) VEHICLE TRAVELING SUPPORT APPARATUS

(71) Applicant: TOYOTA JIDOSHA KABUSHIKI KAISHA, Toyota (JP)

(72) Inventor: Hirohito Ide, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 374 days.

This patent is subject to a terminal disclaimer.

(21) Appl. No.: 17/307,527

(22) Filed: May 4, 2021

(65) Prior Publication Data

US 2021/0316787 A1  Oct. 14, 2021

Related U.S. Application Data

(63) Continuation of application No. 16/835,967, filed on Mar. 31, 2020, now Pat. No. 11,027,778, which is a continuation of application No. 16/027,818, filed on Jul. 5, 2018, now Pat. No. 10,640,148.

(30) Foreign Application Priority Data

Jul. 6, 2017  (JP) ................................ 2017-132891

(51) Int. Cl.
*B62D 15/02* (2006.01)
*B62D 6/00* (2006.01)
*G08G 1/16* (2006.01)

(52) U.S. Cl.
CPC ......... *B62D 15/0255* (2013.01); *B62D 6/002* (2013.01); *B62D 15/024* (2013.01); *B62D 15/025* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 10,065,639 B2 * | 9/2018 | Taniguchi | B62D 15/025 |
| 10,239,532 B2 * | 3/2019 | Mielenz | B60W 30/18145 |
| 10,640,148 B2 * | 5/2020 | Ide | B62D 15/024 |
| 2005/0270145 A1 | 12/2005 | Kataoka et al. | |
| 2010/0030430 A1 | 2/2010 | Hayakawa et al. | |
| 2012/0150437 A1 * | 6/2012 | Zeng | B60W 30/12 342/357.33 |

(Continued)

FOREIGN PATENT DOCUMENTS

| | | | |
|---|---|---|---|
| JP | 2002-163642 A | 6/2002 | |
| JP | 2008-195402 A | 8/2008 | |

(Continued)

*Primary Examiner* — Adam D Tissot
*Assistant Examiner* — Garrett F Evans
(74) *Attorney, Agent, or Firm* — Sughrue Mion, PLLC

(57) ABSTRACT

A driving support ECU is configured to, when s specific recognition state occurs where a lane marker recognized changes from a left lane marker to a right lane marker or vice versa under a one side lane marker recognizable state, set a steering angle guard value to a second steering angle guard value smaller than a first steering angle guard value and set a steering angle speed guard value to a second steering angle speed guard value smaller than a first steering angle speed guard value.

11 Claims, 6 Drawing Sheets

(56) References Cited

U.S. PATENT DOCUMENTS

| | | |
|---|---|---|
| 2013/0197713 A1 | 8/2013 | Yoshihama |
| 2015/0225017 A1 | 8/2015 | Takeda |
| 2017/0043442 A1* | 2/2017 | Takikawa ................ B05B 15/60 |
| 2020/0223484 A1 | 7/2020 | Ide |

FOREIGN PATENT DOCUMENTS

| | | |
|---|---|---|
| JP | 2009-190464 A | 8/2009 |
| JP | 4349210 B2 | 10/2009 |
| JP | 2010-006279 A | 1/2010 |

* cited by examiner

VEHICLE TRAVELING SUPPORT APPARATUS

BACKGROUND OF THE INVENTION

1. Field of the Invention

The present invention relates to a vehicle traveling support apparatus for performing a lane keeping support/assist control which supports a travel of a vehicle (an own vehicle) by using white lines in such a manner that the own vehicle travels/runs in the vicinity of the center of a lane.

2. Description of the Related Art

A vehicle traveling support apparatus, which has been conventionally known, recognizes lane markers (hereinafter, also simply referred to as "white lines") such as a white one, a yellow line, and the like on a road by using a lane marker recognizing device (for example, at least any one of a camera sensor and a radar sensor) provided on an own vehicle to perform a lane keeping support control which supports a travel of a vehicle (an own vehicle) by using the recognized white lines in such a manner that the own vehicle travels in the vicinity of the center of a lane.

For example, one example of the vehicle traveling support apparatuses detects the left and right white lines on a traveling lane in which the own vehicle is traveling using the camera sensor and sets/determines, as a target traveling line, a predetermined position (for example, the center position in the left and right white lines) based on positions of the detected left and right white lines.

Then, the vehicle traveling support apparatus controls a steering angle of the own vehicle so as to have the own vehicle travel along the set target traveling line.

Furthermore, as a lane marker recognizing technique which can be applied to such a vehicle traveling support apparatus, in a situation where one of the left and right white lines is unable to be recognized, a device has been known, which extrapolates a position of the unrecognized white line by using the recognized white line and an extrapolated lane width (for example, refer to Japanese Patent Application Laid-Open No. 2002-183642).

The inventor of the present application has studied the vehicle traveling support apparatus which uses, as the target traveling line, a line passing through positions, each of which is determined based on one white line which has been recognized and the extrapolated/estimated lane width, when one of the left and right white lines cannot be recognized.

However, in this apparatus, the following problems may occur, That is, when a specific recognition state occurs where the one recognizable white line changes from the left white line (the left lane marker) to the right white line (the right lane marker) or vice versa, a position of the target traveling line may change greatly from a position at a time point immediately before the specific recognition state occurs. When the position of the target traveling line changes greatly, a steering angle of the own vehicle changes greatly. As a result, a behavior of the own vehicle becomes unstable. It should be noted that a reason why the position of the target traveling line changes greatly before and after the specific recognition state occurs will be described later.

SUMMARY OF THE INVENTION

The present invention has been made in order to solve the above-described problem. That is, one of objects of the present invention is to provide a vehicle traveling support apparatus which can reduce a possibility that a traveling stability of an own vehicle degrades due to a great change in steering the own vehicle, when the above-described specific recognition state occurs while one of left and right white lines is being unable to be recognized. Hereinafter, the vehicle traveling support apparatus according to the present invention may be referred to as a "present invention apparatus".

The present invention apparatus includes:
lane marker recognition means (10, 17) for recognizing a lane marker on a traveling lane in which an own vehicle is traveling;
control means (10) for performing a lane keeping control to control a steering angle of the own vehicle so as to have the own vehicle travel along a target traveling line (Ld) set based on at least the lane marker; and
estimating lane width means (10) for estimating a lane width of the traveling lane.

The control means is configured:
when a recognition state of the lane marker by the lane marker recognition means is a both lane markers recognizable state which is a state where the lane marker recognition means can recognize both a left lane marker (LL) on a left side with respect to the own vehicle and a right lane marker (LR) on a right side with respect to the own vehicle (refer to a "No" determination at step 525),
to set the target traveling line based on the left lane marker and the right lane marker (refer to step 526); and
to perform a first limiting process (refer to step 528) including one of,
a first steering angle magnitude limiting process for limiting the steering angle in such a manner that a magnitude of the steering angle does not exceed a first steering angle guard value, and
a first steering angle speed magnitude limiting process for limiting the steering angle in such a manner that a magnitude of a steering angle speed which is an amount of change per unit time of the steering angle does not exceed a first steering angle speed guard value.

It should be noted that the estimating lane width means may acquire a distance between the left lane marker and the right lane marker as the lane width (W) in the both lane markers recognizable state to use the acquired lane width (W) as a lane width (W1), when the recognition state of the lane marker is a one side lane marker recognizable state which will be described later, thereby estimating the lane width (W1). Furthermore, the estimating lane width means may acquire the lane width (W) from an external network system by a communication with the external network system, thereby estimating the lane width (W1) when the recognition state of the lane marker is the one side lane marker recognizable state which will be described later.

As shown in FIG. 4, the recognition state of the lane marker may change from the both lane markers recognizable state (a time t0 to a time 1) to the one side lane marker recognizable state where only one of the white lines (lane markers) (the time t1 to a time t3) can be recognized. In the one side lane marker recognizable state, the above control means cannot set the target traveling line based on both the left and right lane markers.

In view of the above, the control means is configured:
to set the target traveling line (refer step 535) based on the lane marker which is recognized by the lane marker recognition means and the estimated lane width (W1), when the recognition state of the lane marker by the lane marker recognition means is the one side lane marker recognizable state which is a state where the lane marker recognition means can recognize only one of the left lane marker and the right lane marker (refer to a "Yes" determination at step 525).

However, as shown in FIG. 4, while the recognition state of the lane marker is the one side lane marker recognizable state (the time t1 to the time t3), a case may occur where the estimated lane width (W1) and the true lane width (Wtrue) are greatly different from each other. In this case, when the left white line continues to be recognized before and after the time t1 (a position of) the target traveling line does not change greatly (refer to Ld1 and Ld2).

However, immediately after the time t2 at which the recognizable lane marker changes from the left white line to the right white line (immediately after a time point at which the above-described specific recognition state occurs), setting the target traveling line (Ld3) based on the position of the right white line and the lane width (W1=W) causes a great change in the position of the target traveling line (refer to Ld2 and Ld3). As a result, a deviation/difference between the position of the own vehicle and the target traveling line becomes abruptly/suddenly large. Therefore, the steering angle is changed greatly by the lane keeping control, so that a traveling stability of the own vehicle is likely to degrade.

In view of the above, the control means is configured
to perform, when a specific recognition state occurs where the lane marker recognized by the lane marker recognition means changes from the left lane marker to the right lane marker or vice versa (refer to a "Yes" determination at step 615 and step 625) under the one side lane marker recognizable state (refer to a "Yes" determination at step 525), a second limiting process (refer to step 550) including one of,
a second steering angle magnitude limiting process, in place of the first steering angle magnitude limiting process, for limiting the steering angle in such a manner that the magnitude of the steering angle does not exceed a second steering angle guard value smaller than the first steering angle guard value, and
a second steering angle speed magnitude limiting process, in place of the first steering angle speed magnitude limiting process, for limiting the steering angle in such a manner that the magnitude of the steering angle speed does not exceed a second steering angle speed guard value smaller than the first steering angle speed guard value.

This allows any one of the maximum magnitude of the steering angle and the maximum magnitude of the steering angle speed to become smaller, as compared with when the recognition state of the lane marker is the both lane markers recognizable state. As a result, a yaw rate of the own vehicle does not change abruptly/suddenly, and thus, the possibility that the traveling stability of the own vehicle degrade can be reduced.

In one of aspects of the present invention apparatus,
the control means is configured to perform the first limiting process (refer to step 528) in place of the second limiting process when the specific recognition state has occurred (refer to a "No" determination at step 630 and step 635) after the own vehicle crossed the lane marker recognized by the lane marker recognition means, while the recognition state of the lane marker by the lane markers recognition means is the one &de lane marker recognizable state.

The above-described specific recognition state may also occur immediately after the own vehicle crosses the one white line that has been recognized after the position in the vehicle width direction of the own vehicle changes so as to approach the white line for some reason. In such a case, the target traveling line is rarely changed. Therefore, even if the second guard limiting process is not performed, the steering state of the own vehicle is unlikely to change abruptly/suddenly. Conversely, it is rather preferable to cause the own vehicle to quickly approach the target traveling line through setting the guard values relating the steering angle (that is, the steering angle guard value and the steering angle speed guard value) to large values using the first limiting process. Furthermore, in such a situation, if the target traveling line is changed to "a target traveling line for a changed lane on the side to which the own vehicle has moved", the own vehicle should be made to come closer to the changed target traveling line more quickly. For this reason, it is not necessary to perform the second limiting process. Therefore, according to the above-mentioned aspect, when the second limiting process is unnecessary, the second limiting process is not performed, so that the lane keeping control can be appropriately performed.

In one of aspects of the present invention apparatus,
the control means is configured, when a particular state has continued for a predetermine period from a time point at which the specific recognition state occurred (refer to a "Yes" determination at step 635 and step 640), the particular state being a state where the recognition state of the lane marker by the lane marker recognition means is the one side lane marker recognizable state and the particular recognition state does not occur, to perform a third limiting process including at least any one of,
a third steering angle magnitude limiting process, in place of the second steering angle, magnitude limiting process, for the steering angle in such a manner that the magnitude of the steering angle does not exceed a third steering angle guard value larger than the second steering angle guard value and equal to or smaller than the first steering angle guard value; and
a third steering angle speed magnitude limiting process, in place of the third steering angle speed magnitude limiting process, for limiting the steering angle speed in such a manner that the magnitude of the steering angle speed does not exceed a third steering angle speed guard value larger than the second steering angle speed guard value and equal to or smaller than the first steering angle speed guard value.

When the above particular state is continued for the above predetermined period from the time point at which the specific recognition state has occurred, a sufficient time has elapsed after the target traveling line changed greatly, and thus, the own vehicle is likely to travel in the vicinity of the target traveling line, Therefore, after this time point, even if the guard values relating the steering angle (that is, the steering angle guard value and the steering angle speed guard value) are set to the large values, the traveling stability of the own vehicle is unlikely to degrade. Therefore, according to the above-mentioned aspect, when the second limiting process is unnecessary, the third limiting process is performed, so that the lane keeping control can be appropriately performed.

It should be noted that the third steering angle guard value used in the above third steering angle magnitude limiting process may be the same as the above first steering angle guard value. Note that, however, since reliability of the target traveling line under the one lane marker recognizable state is lower than reliability of the target traveling line under the both lane markers recognizable state, it is preferable that "the third steering angle guard value used in the above third steering angle magnitude limiting process be larger than the above second steering angle guard value and be smaller than the above first steering angle guard value".

Similarly, the third steering angle speed guard value used in the above third steering angle speed magnitude limiting process may be the same as the first steering angle speed guard value. It should be noted, however, as mentioned above, that the reliability of the target traveling line under the one lane marker recognizable state is lower than the reliability of the target traveling line under the both lane markers recognizable state. Thus, it is preferable that "the third steering angle speed guard value used in the above third steering angle speed magnitude limiting process be larger than the above second steering angle speed guard value and be smaller than the above first steering angle speed guard value".

In one of aspects of the present invention apparatus,
the control means is configured to determine that the particular state has continued for the predetermine period, when a duration time of the particular state from a time point at which the specific recognition state occurred becomes equal to or longer than a threshold duration time.

In one of aspects of the present invention apparatus,
the control means is configured to determine that the particular state has continued for the predetermine period, when a traveling distance of the own vehicle under the particular state from a time point at which the specific recognition state occurred becomes equal to or longer than a threshold traveling distance.

In the above description, references used in the following descriptions regarding embodiments are added with parentheses to the elements of the present invention, in order to assist in understanding the present invention. However, those references should not be used to limit the scope of the invention. Other objects, other features, and accompanying advantages of the present invention will be readily understood from the description of embodiments of the present invention to be given referring to the following drawings.

DETAILED DESCRIPTION OF THE PREFERRED EMBODIMENT

Figure 1:
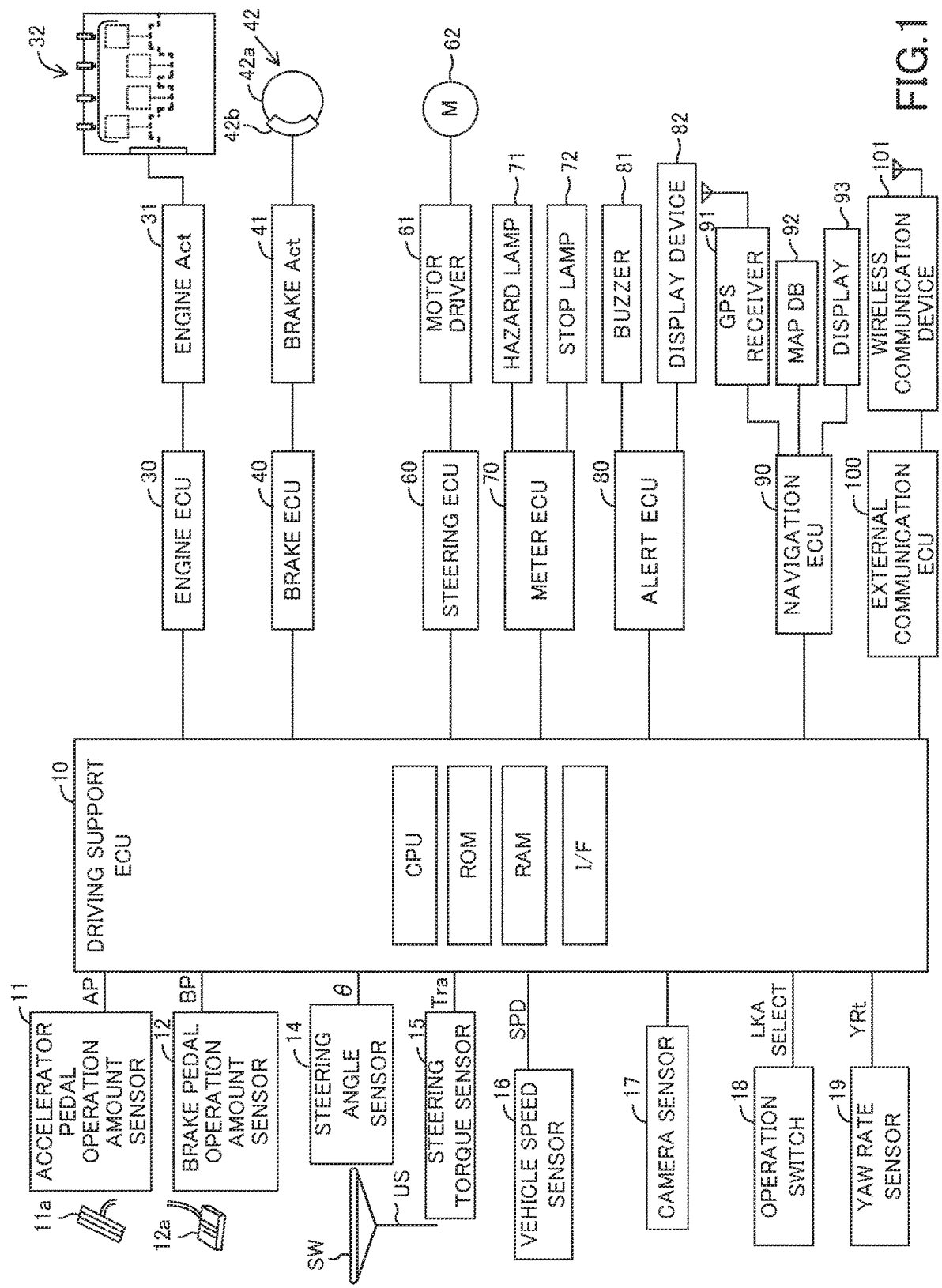
FIG. 1 is a schematic configuration diagram of a vehicle traveling control apparatus according to an embodiment of the present invention.

A vehicle traveling control apparatus (vehicle traveling support/assist apparatus) according to an embodiment of the present invention will be described below, referring to the drawings.

<Construction>

As shown in FIG. 1, the vehicle traveling control apparatus (hereinafter, referred to as an "embodiment apparatus") according to the embodiment of the present invention is applied to a vehicle. The vehicle will be referred to as an "own vehicle" in order to distinguish the vehicle, to which the embodiment apparatus is applied, from the other vehicles. The embodiment apparatus includes a driving support ECU 10, an engine ECU 30, a brake ECU 40, a steering ECU 60, a meter ECU 70, an alert ECU 80, a navigation ECU 90, and an external communication ECU 100. It should be noted that the driving support ECU 10 is simply referred to as a "DSECU", in the following description.

Each of those ECUs is an electronic control unit comprising a microcomputer as a main part. The ECUs are connected with each other via CAN (Controller Area Network) which is not illustrated so that they are capable of mutually transmitting and receiving information. In the present specification, the microcomputer includes a CPU, a ROM, a RAM, a non-volatile memory, an interface I/F, and the like. The CPU is configured to realize/achieve various functions through executing instructions (programs, routines) stored in the ROM. Some or all of those ECUs may be integrated into a single ECU.

The DSECU is connected to sensors (including switches) described below and is configured to receive a detection signal or an output signal of each of the sensors. It should be noted that each of the sensors may be connected to one of the ECUs other than the DSECU. In this case, the DSECU receives the detection signal or the output signal of the sensor via CAN from the ECU to which that sensor is connected.

An accelerator pedal operation amount sensor 11 is configured to detect an operation amount (an accelerator opening degree) of an accelerator pedal 11*a* of the own vehicle to output a signal indicative of the detected operation amount (the accelerator pedal operation amount AP). A brake pedal operation amount sensor 12 is configured to detect an operation amount of a brake pedal 12*a* to output a signal indicative of the detected operation amount (the brake pedal operation amount BP).

A steering angle sensor 14 is configured to detect a steering angle of the own vehicle to output a signal indicative of the detected steering angle (the steering angle θ). It should be noted that the steering angle θ is defined to be a positive value when a steering wheel SW is rotated in the left direction from the neutral position and the steering angle θ is defined to be a negative value when the steering wheel SW is rotated in the right direction from the neutral position. A steering torque sensor 15 is configured to detect a steering torque applied to a steering shaft US of the own vehicle through an operation of the steering wheel SW to output a signal indicative of the detected steering torque (the steering torque Tra). A vehicle speed sensor 16 is configured to detect a traveling speed (a vehicle speed) of the own vehicle to output a signal indicative of the detected vehicle speed (the vehicle speed SPD). It should be noted that the DSECU is configured to calculate a steering angle speed (=dθ/dt) which is an amount of change per unit time of the steering angle θ received from the steering angle sensor.

The camera sensor 17 includes a stereo camera and a processing part to photograph (take an image of) views/landscapes of the left and the right side area in front (ahead) of the own vehicle so as to acquire images of the views/landscapes at the right and left sides of the own vehicle, every time a predetermined time elapses. The camera sensor 17 transmits the photographed images to the DSECU.

The DSECU executes an image processing for the image data received from a camera sensor 17 to acquire an image processing data. The DSECU acquires (recognizes) lane markers (hereinafter, simply referred to as "white lines") on the road in which the own vehicle is traveling by using the image processing data. The DSECU recognizes, as a left white line, a white line on the left side of the own vehicle in the traveling direction of the own vehicle. The DSECU recognizes, as a right white line, a white line on the right side of the own vehicle in the traveling direction of the own vehicle.

An operation switch 18 is a switch operated by a driver. The driver can operate the operation switch 18 to select whether or not a lane keeping control is to be performed. It should be noted that the lane keeping control is also referred to as "LKA (a lane keeping assist control)".

A yaw rate sensor 19 is configured to detect a yaw rate of the own vehicle to output a signal indicative of the detected yaw rate (an actual yaw late YRt).

The engine ECU 30 is connected to an engine actuator 31. The engine actuator 31 is an actuator for changing an operation state of an internal combustion engine 32, in the present example, the internal combustion engine 32 is a gasoline fuel injection • spark ignition type • multi-cylinder engine, and includes a throttle valve for adjusting an intake air amount of the internal combustion engine 32. The engine actuator 31 includes at least a throttle valve actuator for changing an opening degree of the throttle valve. The engine ECU 30 changes a torque generated by the internal combustion engine 32 through driving the engine actuator 31. The torque generated by the internal combustion engine 32 is transmitted to driving wheels (not shown) via a transmission (not shown). Therefore, the engine ECU 30 can control the engine actuator 31 to control a driving force of the own vehicle, to thereby be able to change an acceleration state (acceleration) of the own vehicle.

The brake ECU 40 is connected to a brake actuator 41. The brake actuator 41 is provided in a hydraulic pressure circuit provided between a master cylinder 45 (not shown) for pressurizing hydraulic oil using a depression force of the brake pedal 12a and a friction brake mechanism 42 provided in right-and-left front-and-rear wheels. The friction brake mechanism 42 includes brake discs 42a each secured to the corresponding wheel of the own vehicle and brake calipers 42b each secured to the body of the own vehicle at the corresponding wheel. The brake actuator 41 adjusts, in response to an instruction from the brake ECU 40, a hydraulic pressure to be supplied to a wheel cylinder built in the brake caliper 42b of the friction brake mechanism 42 to press a brake pad onto a brake disk 42a using the hydraulic pressure so as to generate a friction braking force. Therefore, the brake ECU 40 can control the brake actuator 41 to control a braking force applied to the own vehicle SV.

The steering ECU 60 is a control unit of a well-known electric power steering system and is connected to a motor driver 61. The motor driver 61 is connected to a steering motor 62. The steering motor 62 is incorporated into a "steering mechanism including a steering wheel, a steering shaft coupled to the steering wheel, a gear mechanism for steering, and the like" of the vehicle. The steering motor 62 generates torque using electric power supplied from the motor driver 61, to thereby be able to add a steering assist torque to the steering mechanism or steer the left-and-right steered wheels using the generated torque. That is, the steering motor 62 can change the steering angle of the own vehicle.

The meter ECU 70 is connected to a digital display meter (not shown), a hazard lamp 71, and a stop lamp 72. The meter ECU 70 blinks the hazard lamp 71 and lights the stop lamp 72, in response to instructions transmitted from the DSECU.

The alert ECU 80 is connected to a buzzer 81 and a display device 82. The alert ECU 80 can have the buzzer 81 generate sounds to alert the driver in response to an instruction transmitted from the DSECU. In addition, the alert ECU 80 can cause the display device 82 to light an attention/alert mark such as a warning lamp and/or to display an attention/alert message and an operation state of a driving support control. It should be noted that the display device 82 is a display device for displaying an image in response to an instruction transmitted from the DSECU. Specifically, the display device 82 is a head-up display. The display device 82 may be another type of display such as a multifunction display.

The navigation ECU 90 is connected to a GPS receiver 91 which receives a GPS detection signal for detecting a present position of the own vehicle, a map database 92 which stores a map information and the like, a touch-screen type display 93 which is a human-machine interface, and the like. The navigation ECU 90 identifies the present position of the own vehicle based on the GPS detection signal. When the own vehicle is traveling in one of a plurality of lanes on a road, the navigation ECU 90 can acquire information for identifying the lane in which the own vehicle is traveling currently. The navigation ECU 90 executes various calculations based on the present position of the own vehicle, the map information stored in the map database 92 and the like to perform a route guidance using the display 93.

The map information stored in the map database 92 includes road information. For example, the road information includes a lane width, and a road curvature radius (or a road curvature) which represents a degree of a curve of the road.

The external communication ECU 100 is connected to a wireless communication device 101. The external communication ECU 100 and the wireless communication device 101 constitutes a wireless communication terminal for communicating with an external network system. The wireless communication device 101 is also capable of performing a wireless communication with a roadside communication device installed on a road. The wireless communication includes both an optical wireless communication and a wireless communication using an electric wave.

<Outline of Operation>

An outline of operation performed by the embodiment apparatus will next be described. The DSECU of the embodiment apparatus is capable of performing the lane keeping control, Hereinafter, the lane keeping control will be described.

<<Lane Keeping Control>>

The DSECU performs the lane keeping control which will be described later, while the execution of the lane keeping control is requested through the operation of the operation switch 18.

The DSECU recognizes (detects) the left and right white lines on the road through analyzing the image data transmitted from the camera sensor 17. The DSECU recognizes the white line on the left side with respect to the center axis of the own vehicle as a left white line LL and the white line on the right side with respect to the center axis of the own vehicle as a right white line LL. The DSECU recognizes an area between the left white line LL and the right white line LR as a traveling lane (a lane) in which the own vehicle SV is traveling. The DSECU sets/determines a target traveling line Ld within the lane using the detected white lines. That is, in this embodiment, the DSECU sets/determines a "center line which is positioned at the center between the left white line LL and the right white line LR" to be (or as) the "target traveling line Ld".

The DSECU performs a steering control for applying the steering torque to the steering mechanism to change the steering angle (turning angle) of the own vehicle SV ire such a manner that a lateral position (that is, a position of the own vehicle SV with respect to the traveling lane in a vehicle width direction) of the own vehicle SV is kept in the vicinity of the target traveling line Ld within the traveling lane.

Meanwhile, for example, a case may occur where the camera sensor 17 cannot detect (recognize) one or both of the white lines due to a road surface condition or deterioration of the white lines. Thus, the DSECU may not always be able to recognize both of the left white line LL and the right white line LR. That is, a state (referred to as a "recognition state of the white lines") on how the DSECU recognizes the white lines is any one of the followings.

A state where both the left white line LL and the right white line LR can be recognized, Hereinafter, this state is also referred to as a "both white lines recognizable state" or a "both lane markers recognizable stale".

A state where one of the left white line LL and the right white line LR can be recognized, but the other white line cannot be recognized. In other words, this is a state where only one of the left white line LL and the right white line LR can be recognized. Hereinafter, this state is also referred to as a "one side white line recognizable state" or a "one side lane marker recognizable state".

A state where the DSECU cannot recognize any of the left white line LL and the right white line LR. Hereinafter, this state is also referred to as a "no white line recognizable state" or a "no lane marker recognizable state".

In view of the above, as will be described later, the DSECU appropriately changes a setting method of the target traveling line depending on (in response to) each of the recognition state of the white lines to perform the steering control for the lane keeping control.

<<A Case where Both of the Left White Line LL and the Right White Line LR can be Recognized (the Both White Lines Recognizable State)>>

Figure 2:
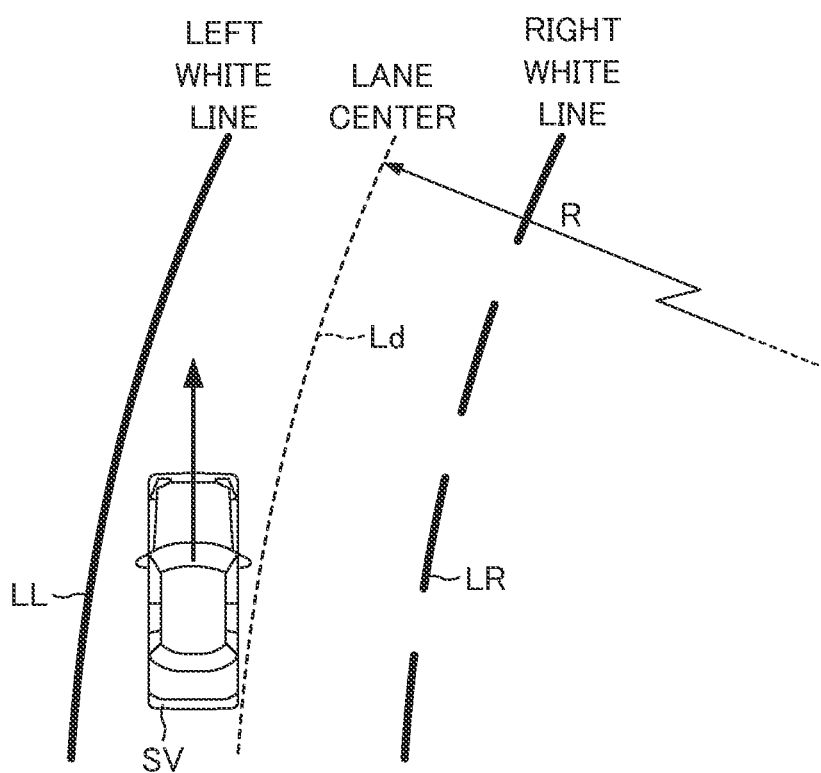
FIG. 2 is a plan view for illustrating a left white line, a right white line, a target traveling line, and a curve radius.

As shown in FIG. 2, when the DSECU can recognize both of the left white line LL and the right white line LR, the DSECU sets/determines, as the target traveling line Ld, the lane center line positioned at a midpoint between the recognized left white line LL and the recognized right white line LR.

In addition, the DSECU calculates a curve radius R of the target traveling line Ld, a curvature CL (=1 R) of the target traveling line Ld, a position of the own vehicle SV in the traveling lane defined by the left white line LL and the right white line LR, and a direction of the own vehicle SV in the traveling lane.

Figure 3:
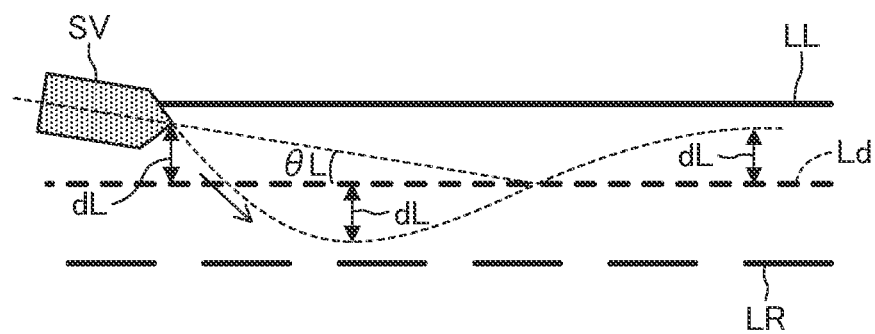
FIG. 3 is a plan view for illustrating a road and a vehicle for explaining a lane keeping control.

More specifically, as shown in FIG. 3, the DSECU calculates a distance dL (a center distance dL) in a road width direction between the center position in the front end of the own vehicle and the target traveling line Ld, and a deviation angle θL (a yaw angle θL) formed between a direction of the target traveling line Ld and a traveling direction of the own vehicle SV.

The DSECU calculates a target yaw rate YRc* based on the center distance dL, the yaw angle θL, and the curvature CL by using the following Expression (1), every time a predetermined time elapses. In Expression (1), each of K1 K2, and K3 is indicative of control gain. The target yaw rate YRc* is indicative of a yaw rate which is set in such a manner that the own vehicle SV can travel along the target traveling line Ld.

$$YRc^* = K1 \times dL + K2 \times \theta L + K3 \times CL \qquad (1)$$

The DSECU calculates a target steering torque Tr* for realizing/accomplishing the target yaw rate YRc* based on the target yaw rate YRc* and the actual yaw rate YRt, every time the predetermined time elapses. More specifically, the DSECU previously stores a look-up table which defines a relationship between the target steering torque Tr* and a difference/deviation between the target yaw rate YRc* and the actual yaw rate YRt. The DSECU calculates/obtains the target steering torque Tr* by applying the difference/deviation between the target yaw rate YRc* and the actual yaw rate YRt to the look-up table.

The DSECU controls the steering motor 62 by using the steering ECU 60 in such a manner that the actual steering torque Tra corresponds (becomes equal) to the target steering torque Tr*, In this manner, the DSECU performs the lane keeping control which controls the steering angle of the own vehicle SV so as to have the own vehicle SV travel along the target traveling line Ld. It should be noted that the DSECU acquires/obtains a lane width W (that is, a distance between the left white line LL and the right white line LR) based on positions of the recognized left white lines LL, LR, and stores the acquired lane width W in the RAM, every time a predetermined time elapses.

The DSECU may perform the lane keeping control as follows, That is, the DSECU sets a target value of the center distance dL to "0" and sets a target value of the yaw angle θL to "0". The DSECU calculates the target steering angle θ* by applying a difference/deviation (that is, the actual center distance dL) between the actual center distance dL and its target value, a difference/deviation (that is, the actual yaw angle θL) between the yaw angle θL and its target value, and the curvature CL to the following Expression (2). Furthermore, the DSECU controls the steering motor 62 by using the steering ECU 60 in such a manner that the actual steering angle θ corresponds (becomes equal) to the target steering angle θ*. In Expression (2), each of Mal Klta2, and Klta3 is indicative of control gain.

$$\theta lta^* = Klta1 \cdot CL + Klta2 \cdot \theta L + Klta3 \cdot dL \qquad (2)$$

It should be noted that the lane keeping control is also referred to as LTA (Lane Tracing Assist). The basic control content of the LTA itself is well known (for example, refer to Japanese Patent Application Laid-Open No, 2008-195402, No. 2009-190464, No. 2010-6279, Japanese Patent No. 4349210 and the like).

<<A Case where the DSECU can Recognize Only One of the Left White Line LL and the Right White Line LR and Cannot Recognize the Other (the One Side White Line Recognizable State)>>

A: When the DSECU can Recognize Only the Left White Line.

When the DSECU can recognize only the left white line LL on the traveling lane in which the own vehicle is traveling, the DSECU extrapolates/determines, as a position of the right white line LR, a position which is obtained through shifting a position of the recognized left white line LL to the right side in the lane width direction by the distance of the estimated/inferred lane width W1. The estimated/inferred lane width W1 is a latest value of the lane width W which was calculated when both of the left white line LL and the right white line LR were recognized. The latest value of the lane width has been stored in the RAM. The DSECU determines, as the target traveling line Ld, a line passing through positions, each of which is a position obtained through shifting the recognized left white line LL to the right side in the lane width direction by a half (=W1/2) of the estimated/inferred lane width W1. In other words, the DSECU sets/determines, as the target traveling line Ld, a lane center line positioned at a midpoint between the recognized left white line LL and the extrapolated right white line LR.

B: When the DSECU can Recognize Only the Right White Line.

When the DSECU can recognize only the right white line LR on the traveling lane in which the own vehicle is traveling, the DSECU extrapolates/determines, as a position of the left white line LL, a position which is obtained through shifting a position of the recognized right white line LR to the left side in the lane width direction by the distance of the estimated/inferred lane width W1. The estimated/inferred lane width W1 is the latest value of the lane width W which was calculated when both of the left white line LL and the right white line LR were recognized. The latest value of the lane width has been stored in the RAM. The DSECU determines, as the target traveling line Ld, a line passing through positions, each of which is a position obtained through shifting the recognized right white line LR to the left side in the lane width direction by a half (=W1/2) of the estimated/inferred lane width W1. In other words, the DSECU sets/determines, as the target traveling line Ld, a lane center line positioned at a midpoint between the recognized right white line LR and the extrapolated left white line LL.

<<A Case where the DSECU Cannot Recognize any of the Left White Line LL and the Right White Line LR (the No White Line Recognizable State)>>

When the DSECU can recognize neither the left white line LL nor the right white line LR, the DSECU cancels the lane keeping control. That is, in this case, the DSECU does not perform the lane keeping control.

<<An Upper Limit Guard Value of the Steering Angle and an Upper Limit Guard Value of the Steering Angle Speed>>

The DSECU limits the steering angle in such a manner that a magnitude of the steering angle does not become larger than the upper limit guard value of the steering angle while performing the lane keeping control. Hereinafter, this upper limit guard value of the steering angle is also referred to as a "steering angle guard value". In addition, the DSECU limits the steering angle speed in such a manner that a magnitude of the steering angle speed does not become larger than the upper limit guard value of the steering angle speed while performing the lane keeping control, Hereinafter, this upper limit guard value of the steering angle speed is also referred to as a "steering angle speed guard value". As a result, a behavior of the own vehicle is unlikely to abruptly/suddenly change due to the change in the steering angle. Therefore, the own vehicle can travel stably (a traveling stability of the own vehicle can be ensured). The above descriptions are the outline of the lane keeping control.

Figure 4:
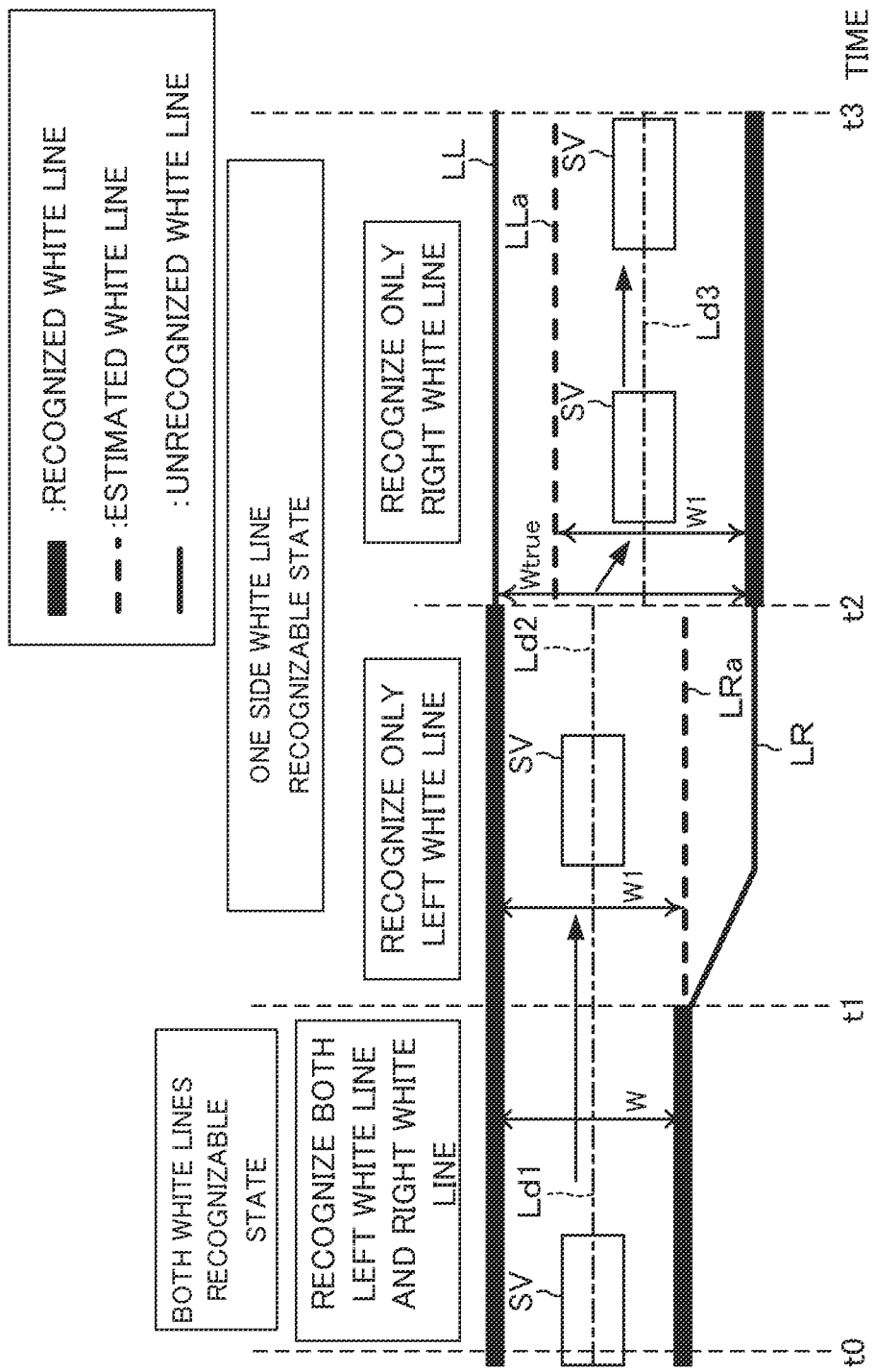
FIG. 4 is a plan view for illustrating the road and the vehicle for explaining an operation of the vehicle traveling control apparatus.

Next, the operation of the embodiment apparatus will be further described with using an example shown in FIG. 4. In the example shown in FIG. 4, the own vehicle SV is traveling within a single lane in a certain road section in a direction shown by arrows. The DSECU is performing the lane keeping control.

In a period from a time to t0 a time point immediately before a time t1, the DSECU recognizes both of the left white line LL and the right white line LR. Therefore, the DSECU sets the lane center line between the left white line LL and a right white line LRa, as the target traveling line Ld1, based on "the recognized positions of the left line LL and the right line LR". The DSECU performs the steering control in such a manner that the own vehicle SV travels along the target traveling line Ld1.

In a period from the time 1 to a time point immediately before a time t2, the DSECU can recognize only the left white line LL but cannot recognize the right white line LR. In this case, the DSECU sets/determines the target traveling line Ld2 based on the position of the left white line LL and the estimated/inferred lane width W1 (the lane width W which was acquired at a time point immediately before the time 0). That is, the DSECU sets/determines the lane center line as the target traveling line Ld2 on the premise that a right white line LRa is present at a position obtained through shifting a position of the recognized left white line LL to the right side by the distance of the estimated/inferred lane width W1. The DSECU performs the steering control in such a manner that the own vehicle SV travels along the target traveling line Ld2.

In a period from the time t2 to a time t3, the DSECU can recognize only the right white line LR, but cannot recognize the left white line LL. In this case, the DSECU sets/determines the target traveling line Ld3 based on the position of the right white line LR and the estimated/inferred lane width W1 (the lane width W which was acquired at a time point immediately before the time t1). That is, the DSECU sets/determines the lane center line as the target traveling line Ld3 on the premise that a left white line LLa is present at a position obtained through shifting a position of the recognized right white line LR to the left side by the distance of the estimated/inferred lane width W1. The DSECU performs the steering control in such a manner that the own vehicle SV travels along the target traveling line Ld3.

As described above, in the period from the time t1 to the time t3, the recognition state of the white lines of the DSECU is the one side white line recognizable state. In the period from the time t1 to the time t2, the estimated/inferred lane width W1 is different from an actual/true lane width Wtrue. However, the position of the white line LRa on the unrecognized side (the right side) which the DSECU has extrapolated/estimated does not deviate/differ from the "actual position of the right white line LR" acquired in the period (period from the time t0 to the time point immediately before the time t1) during which the recognition state of the white lines of the DSECU was the both white lines recognizable state. Further, the position of the left white line which the DSECU has recognized is the actual position of the left white line LL. Therefore, the position of the target traveling line Ld2 does not deviate/differ greatly from the target traveling line Ld1 which has been set by the DSECU while the recognition state of the white lines of the DSECU has been the both white line recognizable state.

However, at the time t2, a direction of a position of the recognizable white line with respect to the own vehicle changes from the left direction to the right direction (that is, the white line recognized by the DSECU changes from the left white line to the right white line), Moreover, the estimated/inferred lane width W1 starts to differ from the actual/true lane width Wtrue at the time t2. As a result, the "position of the white line LLa on the unrecognized side (the left side)" extrapolated/estimated by the DSECU deviates/differs from the actual position of the left white line LL from the time t2. In addition, this extrapolated/estimated position of the white line LLa on the unrecognized side (the left side) differs from the "position of the left white line LL" which the DSECU has recognized up to that time (the time t2).

For the reasons described above, a position of the target traveling line Ld3 in the lane width direction deviates/differs from a position of the target traveling line Ld2 in the lane width direction. Therefore, since the target traveling line abruptly/suddenly changes before and after time t2, the steering state (or angle) of the own vehicle SV abruptly/suddenly changes especially when a change amount in the position of the target traveling line in the lane width direction is relatively large. This may cause a case to occur where the traveling stability of the own vehicle SV is degraded.

In view of the above, in the one side white line recognizable state, the DSECU of the embodiment apparatus decreases the upper limit guard value of the steering angle (the steering angle guard value) and the upper limit guard value of the steering angle speed (the steering angle speed guard value), when a specific recognition state occurs in which a direction of the position of the recognizable white line with respect to the own vehicle changes. The specific recognition state occurs, when the recognizable white line (the lane which the DSECU can recognize) changes from only the left white line to only the right white line during the one side white line recognizable state, or when the recognizable white line changes from only the right white line to only the left white line during the one side white line recognizable state. That is, the specific recognition state is a situation where the one recognizable lane marker has changed between the left lane marker and the right lane marker.

Specifically, unless the specific recognition state occurs while the lane keeping control is being performed, the DSECU sets the steering angle guard value to a predetermined first steering angle guard value and sets the steering angle speed guard value to a predetermined first steering angle speed guard value. Furthermore, when the specific recognition state occurs while the lane keeping control is being performed, the DSECU sets the steering angle guard value to a "second steering angle guard value smaller than the first steering angle guard value" and sets the steering angle speed guard value to a "second steering angle speed guard value smaller than the first steering angle speed guard value". As a result, even if the specific recognition state occurs, the DSECU can reduce the possibility that a "situation where the traveling stability of the own vehicle SV is degraded due to the abrupt/sudden change in the steering state (angle) of the own vehicle SV" occurs.

<Specific Operation>

Next, specific operations of the CPU (hereinafter, simply referred to as the "CPU") of the DSECU will be described. The CPU is configured to execute a routine shown by a flowchart in Fla 5, every time a predetermined time (Δt) elapses.

Figure 5:
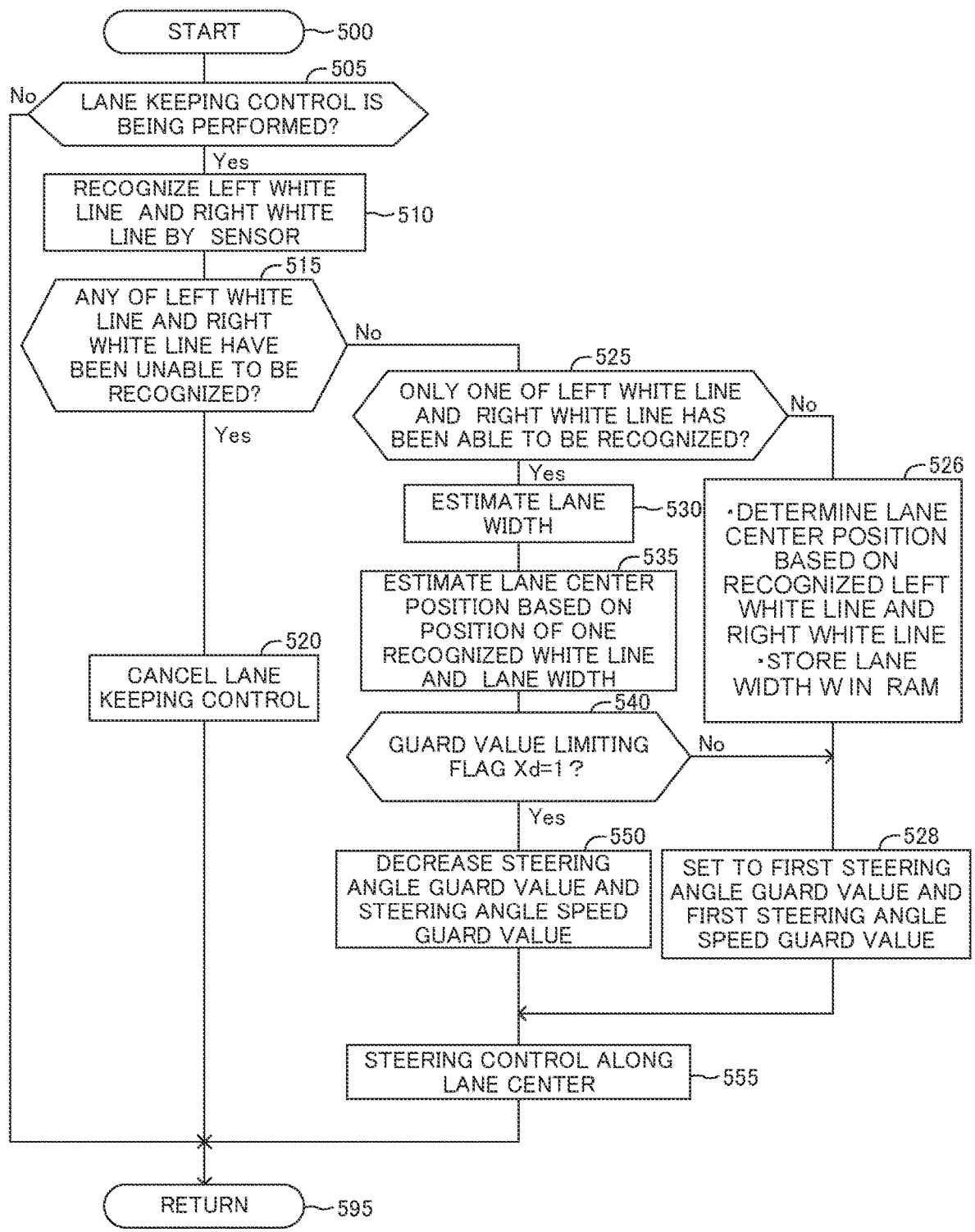
FIG. 5 is a flowchart for illustrating a routine executed by a CPU of a driving support ECU shown in FIG. 1.

Therefore, when a predetermined timing arrives, the CPU starts processing from step 500 in the routine of FIG. 5 and proceeds to step 505 to determine whether or not the lane keeping control is being performed. More specifically, the CPU starts the lane keeping control when the CPU determines that a lane keeping control start condition which will be described later is established. In addition, the CPU continues performing the lane keeping control until (the CPU determines that) a lane keeping control cancellation condition which will be described is established. Therefore, the CPU determines that the lane keeping control is being performed in a period from a time point when the lane keeping control start condition becomes established to a time point when the lane keeping control cancellation condition becomes established.

The lane keeping control start condition is established when all of the following conditions (conditions 1 to 3) are established, for example.

The condition 1 is a condition established when performing the lane keeping control is being selected through the operation of the operation switch 18.

The condition 2 is a condition established when the vehicle speed SPD is equal to or greater/higher than a predetermined lower limit vehicle speed and is equal to or smaller/lower than a predetermined upper limit vehicle speed.

The condition 3 is a condition established when at least any one of the left white line LL and the right white line LR is being recognized by the camera sensor 17 (and the DSECU).

The lane keeping control cancellation condition is established when any one of the following conditions (conditions 4 to 6) is established, for example.

The condition 4 is a condition established when performing the lane keeping control is not being selected through the operation of the operation switch 18.

The condition 5 is a condition established when the vehicle speed SPD is lower than the lower limit vehicle speed.

The condition 6 is a condition established when the vehicle speed SPD is higher than the upper limit vehicle speed.

When the lane keeping control is not being performed, the CPU makes a "No" determination at step 505 and then proceeds to step 595 to tentatively terminate the present routine.

In contrast, when the lane keeping control is being performed, the CPU makes a "Yes" determination at step 505 and then proceeds to step 510 to analyze the image data transmitted from the camera sensor 17 to thereby attempt to recognize the left white line LL and the right white line LR.

Thereafter, the CPU proceeds to step 515 to determine whether or not any of the left white line LL and the right white line has been unable to be recognized at the process of step 510 (i.e., none of the white lines is recognized).

When neither the left white line LL nor the right white line has been recognized, the CPU makes a "Yes" determination and proceeds to step 520 to cancel the lane keeping control. In this case, the CPU stops performing the lane keeping control. Thereafter, the CPU proceeds to step 595 to tentatively terminate the present routine. It should be noted that the state where neither the left white line LL nor the right white line LR can be recognized can be said to be one of cancellation conditions of the lane keeping control.

In contrast, when at least any one of the left white line LL and the right white line LR has been (able to be) recognized, the CPU makes a "No" determination at step 515 and proceeds to step 525 to determine whether or not only one of the left white line LL and the right white line LR has been (able to be) recognized at step 510.

When both of the left white line LL and the right white line LR have been (able to be) recognized at step 510, the CPU makes a No determination at step 525 and proceeds to step 526 to set/determine the target traveling line Ld based on the recognized left white line LL and the recognized right white line LR in the manner described above. In addition, in this case, the CPU calculates a distance between the recognized left white line LL and the recognized right white line LR based on the positions of those white lines to store the calculated distance as the lane width W into the RAM. More specifically, the CPU sets the center line between the recognized left white line LL and the recognized right white line LR as the target traveling line Ld at step 526. The target traveling line Ld set in this manner is very likely to pass through the midpoint of the lane, and is very unlikely to abruptly/suddenly change/move in the lane width direction. Accordingly, a great/abrupt change in the steering state (angle) is unlikely to occur. In other words, steering control reliability is high. For this reason, the steering angle guard value and the steering angle speed guard value do not have to be decreased.

Therefore, in this case, the CPU proceeds to step 528 to set the steering angle guard value $\theta g$ to the first steering angle guard value and set the steering angle speed guard value $d\theta g$ to the first steering angle speed guard value. It should be noted that when the steering angle guard value $\theta g$ is already set to the first steering angle guard value and the steering angle speed guard value $d\theta g$ is set to the first steering angle speed guard value at a time point at which the process of the step 528 is started, the CPU maintains the steering angle guard value $\theta g$ and the steering angle speed guard value $d\theta g$ at the first steering angle guard value and the first steering angle speed guard value, respectively.

Thereafter, the CPU proceeds to step 555 to control the steering angle of the own vehicle SV in such a manner that the own vehicle SV travels along the target traveling line Ld set at step 526. More specifically, the CPU calculates the target steering angle $\theta^*$ by using the above-described Expression (1) or the above-described Expression (2).

Then, if a magnitude of the target steering angle $\theta^*$ is equal to or larger than the steering angle guard value $\theta g$ ($\theta g > 0$), the CPU changes the target steering angle $\theta^*$ in such a manner that the target steering angle $\theta^*$ has a magnitude equal to the steering angle guard value $\theta g$. That is, if the target steering angle $\theta^*$ is a positive value and is larger than the steering angle guard value $\theta g$, the CPU sets the target steering angle $\theta^*$ to "$\theta g$". Furthermore, if the target steering angle $\theta^*$ is a negative value and its magnitude $|\theta^*|$ is larger than the steering angle guard value $\theta g$, the CPU sets the target steering angle to "$-\theta g$".

Furthermore, the CPU subtracts the "target steering angle $\theta^*$ (that is, the previous target steering angle $\theta^* p$) calculated the predetermined time ($\Delta t$) before (in other words, calculated at a time point at which the present routine was previously executed)" from the "current target steering angle $\theta^*$ (that is, the present target steering angle $\theta^* n$) calculated at the present time point", to thereby calculate a target steering angle change amount ($\theta^* n - \theta^* p$). Furthermore, the CPU divides the target steering angle change amount ($\theta^* n - \theta^* p$) by the predetermined time ($\Delta t$) to thereby calculate a target steering angle change amount per unit time (($\theta^* n - \theta^* p)/\Delta t$).

Then, when a magnitude of the target steering angle change amount per unit time $|(\theta^* n - \theta^* p)/\Delta t|$ is equal to or larger than the steering angle speed guard value $d\theta g$ ($d\theta g > 0$), the CPU changes $\theta^* n$ in such a manner that the magnitude $|(\theta^* n - \theta^* p)/\Delta t|$ is equal to the steering angle speed guard value $d\theta g$. That is, if the target steering angle change amount per unit time ($\theta^* n - \theta r^* p/\Delta t$) is a positive value and is larger than the steering angle speed guard value $d\theta g$, the CPU sets the target steering angle to a "value ($=\theta^* p + d\theta g \times \Delta t$) obtained by adding the value $d\theta g \times \Delta t$ to the value $\theta^* p$". If the target steering change amount per unit time (($\theta^* n - \theta^* p)/\Delta t$) is a negative value and its magnitude $|(\theta^* n - \theta^* p)/\Delta t|$ is larger than the steering angle speed guard value $d\theta g$, the CPU sets the target steering angle to a "value ($=\theta^* p - d\theta g \times \Delta t$) obtained by subtracting the value $d\theta g \times \Delta t$ from the value $\theta^* p$".

The CPU controls the steering motor 62 in such a manner that the actual steering angle $\theta$ coincides with the target steering angle $\theta^*$ determined in this manner. As a result, the steering angle $\theta$ is controlled in such a manner that its magnitude $|\theta|$ does not exceed the steering angle guard value $\theta g$ (this $\theta g$ is currently set at the first steering angle guard value) and a magnitude $|d\theta/dt|$ of its change amount per unit time does not exceed the steering angle speed guard value $d\theta g$ (this $d\theta g$ is currently set at the first steering angle speed guard value).

In contrast, when only one of the left white line LL and the right white line LR has been (able to be) recognized at the time point at which the process of step 525 is executed, the CPU makes a "Yes" determination and proceeds to step 530 to estimate/infer the estimated/inferred lane width W1 in the manner described above. That is, the CPU reads out the lane width W stored in the RAM as the estimated/inferred lane width W1.

Thereafter, the CPU proceeds to step 535 to set the target traveling line Ld in the manner described above, based on the position of the one recognized white line and the estimated/inferred lane width W1 obtained at step 530.

Subsequently, the CPU proceeds to step 540 to determine whether or not a value of a guard value limiting flag Xd is "1". The guard value limiting flag Xd is set to "1" through a guard value limiting determination routine shown in FIG. 6 described later, when the specific recognition state has occurred and thus a state of the own vehicle is in a state in which the steering angle guard value and the steering angle speed guard value should be decreased. When the state of the own vehicle is not in such a state, the value of the guard value limiting flag Xd is set to "0" through the guard value limiting determination routine shown in FIG. 6 described later.

When the guard value limiting flag Xd is not "1", the CPU makes a "No" determination at step 540 and proceeds to step 528 to execute the process which has been already described at step 528. Furthermore, the CPU proceeds to step 555 to control the steering angle of the own vehicle SV so as to have the own vehicle SV travel along the target traveling line Ld which has been set at step 535. Thereafter, the CPU proceeds to step 595 to tentatively terminate the present routine.

In contrast, when the value of the guard limiting flag Xd is "1", the CPU makes a "Yes" determination at step 540 and proceeds to step 550 to decrease the steering angle guard value $\theta g$ and the steering angle speed guard value $d\theta g$. More specifically, the CPU sets the steering angle guard value $\theta g$ to the second steering angle guard value and sets the steering angle speed guard value $d\theta g$ to the second steering angle speed guard value. It should be noted that the second steering angle guard value is smaller than the first steering angle guard value, and the second steering angle speed guard value is smaller than the first steering angle speed guard value. Furthermore, when the steering angle guard value is already set to the second steering angle guard value and the steering angle speed guard value is set to the second steering angle speed guard value at a time point at which the process of the step 540 is started, the CPU maintains the steering angle guard value and the steering angle speed guard value at the second steering angle guard value and the second steering angle speed guard value, respectively.

Thereafter, the CPU proceeds to step 555 to control the steering angle of the own vehicle SV in such a manner that the own vehicle SV travels along the target traveling line Ld set at step 535. As a result, the steering angle $\theta$ is controlled in such a manner that its magnitude $|\theta|$ does not exceed the steering angle guard value $\theta g$ (this $\theta g$ is currently set at the second steering angle guard value) and the magnitude $|d\theta/dt|$ of its change amount per unit time does not exceed the steering angle speed guard value $d\theta g$ (this $d\theta g$ is currently set at the second steering angle speed guard value). Then, the CPU proceeds to step 595 to tentatively terminate the present routine.

Next, the guard value limiting determination routine will be described, referring to FIG. 6. The CPU is configured to execute a routine shown by a flowchart of FIG. 6, every time the predetermined time elapses.

Figure 6:
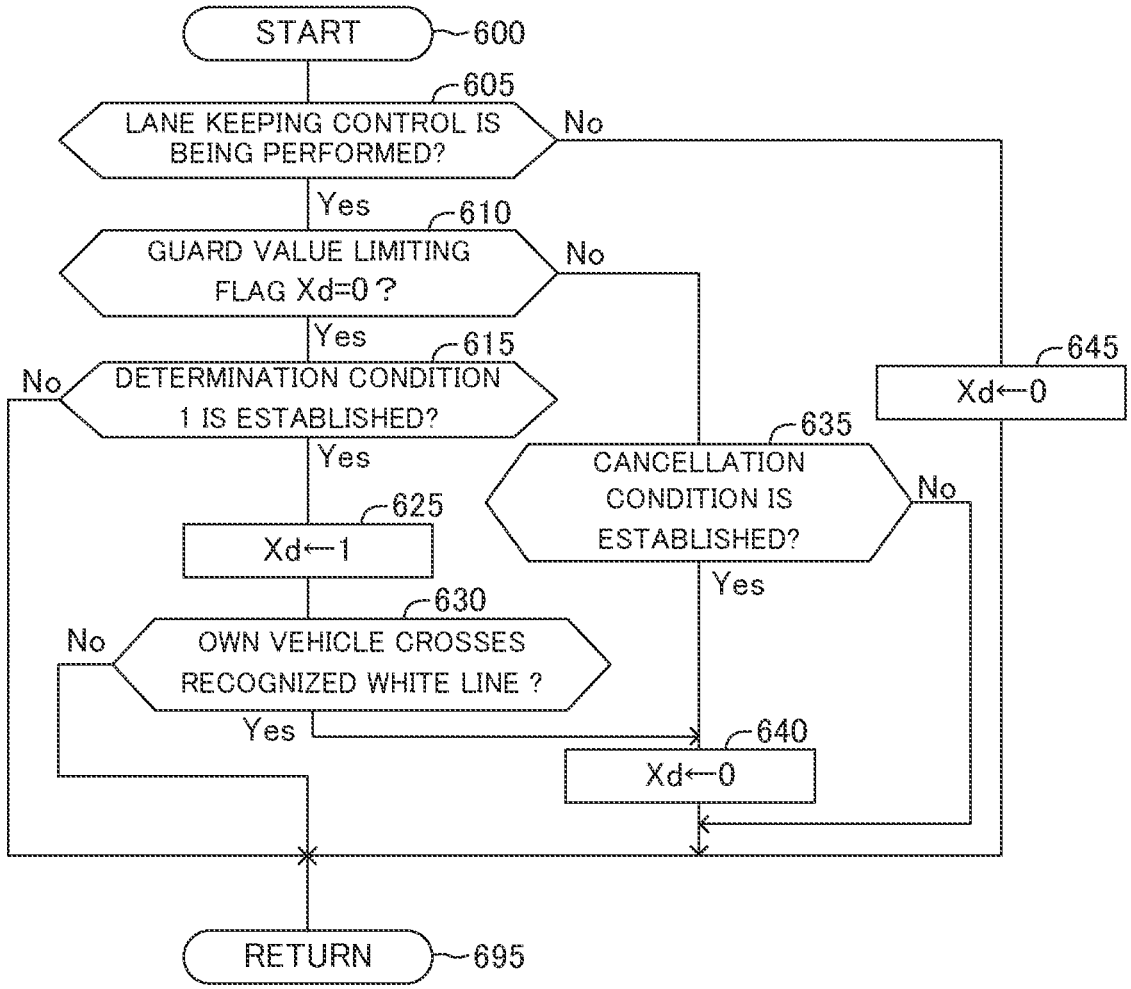
FIG. 6 is a flowchart for illustrating a routine executed by the CPU of the driving support ECU shown in FIG. 1.

Therefore, when a predetermined timing arrives, the CPU starts processing from step 600 of the routine of FIG. 6 and proceeds to step 605 to determine whether or not the lane keeping control is being performed, similarly to step 505.

When the lane keeping control is being performed, the CPU makes a "Yes" determination at step 605 and proceeds to step 610 to determine whether or not the value of the guard value limiting flag Xd is "0", It should be noted the value of the guard value limiting flag Xd is set to "0" through an initialization routine executed by the CPU when an ignition switch (not shown) provided for the own vehicle SV is changed from an ON position to an OFF position.

When the guard value limiting flag Xd is "0", the CPU makes a "Yes" determination at step 610 to proceed to step 615 to determine whether or not the following determination condition (hereinafter, referred to as a "determination condition 1") of the specific recognition state occurrence is established.

The determination condition 1 is a condition established when both of the following conditions are satisfied.

only one of the left white line LL and the right white line LR (either the line LL or the line LR) was recognized at the time point at which the process of step 510 was executed when the present routine was previously executed the predetermined time before the present time (that is, in the previous calculation); and a direction of the white line recognized with respect to the own vehicle SV in the previous calculation and a direction of the white line recognized with respect to the own vehicle SV in the current calculation (execution) of the present routine (in the present calculation) are difference from each other (that is, the direction of the position of the white line recognized at the previous calculation differs from the direction of the position of the white line recognized at the present calculation).

That is, the determination condition 1 is satisfied, when each of a recognition states of the lane markers (white lines) at the present time point and at the time point the predetermined time before the present time point is the one side lane marker recognizable state; and when the one recognized lane marker (the lane marker which has been recognized) changes from the left lane marker to the right lane marker or vice versa in a period between the present time point and the time point the predetermined time before the present time point.

When the determination condition 1 is established, it can be determined that the specific recognition state has occurred. In this case, the position of the target traveling line may greatly deviate/differ from the position at a time point immediately before the specific recognition state has occurred. Thus, steering state (angle) of the own vehicle SV may abruptly/suddenly change greatly. For this reason, it is preferable (and/or required) to decrease the steering angle guard value and the steering angle speed guard value. Therefore, when the determination condition 1 is established, the CPU makes a "Yes" determination at step 615 and proceeds to step 620 to set the value of the guard value limiting flag Xd to "1".

Thereafter, the CPU proceeds to step 630 to determine whether or not the own vehicle has crossed the white line (i.e., recognized white line) which has been recognized. For example, it is determined that the determination condition 1 is established at step 615, and thus, it is determined that the specific recognition state has occurred, under a situation where only a right white line has been recognized, when the own vehicle has crossed the right white line, and then, a case has occurred where only that right white line (which becomes a left white line after the own vehicle has crossed that right white line) can be recognized.

However, in this case, the own vehicle has already changed lanes. Therefore, the target traveling line is changed from the original target traveling line to a lane center line of a lane in which the own vehicle is travelling after the own vehicle has changed lanes. In this case, it is preferable to quickly change the steering angle to have the own vehicle approach the new target traveling line after the lane change. For this reason, it is not necessary to decrease the steering angle guard value and the steering angle speed guard value in this case.

Therefore, when the own vehicle SV has already crossed the "recognized white line", the CPU makes a "Yes" determination to proceed to step $40 to set the value of the guard value limiting flag Xd to "0". Thereafter, the CPU proceeds to step 695 to tentatively terminate the present routine. As a result, the value of the guard value limiting flag Xd is maintained at "0".

In contrast, when the own vehicle SV has not crossed the "recognized white line" yet, the CPU makes a "No" determination and proceeds to step 695 to tentatively terminate the present routine.

In contrast, when the determination condition 1 is not established at the time point at which the CPU execute the process of step 615, it can be determined that the specific recognition state has not occurred yet. In this case, the possibility that the target traveling line Ld changes abruptly/suddenly is very low, and thus, an abrupt/sudden change in steering state (angle) is very unlikely to occur (in other words, the reliability of steering control is high). For this reason, each of the steering angle guard value and the steering angle speed guard value does not have to be set to a small value. Therefore, when the determination condition 1 is not established, the CPU makes a "No" determination at step 615 and proceeds directly to step 695 to tentatively terminate the present routine. As a result, the value of the guard value limiting flag Xd is maintained at "0".

Furthermore, when the value of the guard value is "1" at the time point at which the CPU execute the process of step 610, the CPU makes a "No" determination at step 610 and proceeds to step 635 to determine whether or not a cancellation condition is established. The cancellation condition is a condition established when any one of the following conditions ("the condition A and the condition B") is established.

The condition A: the condition A is a condition established when the CPU can recognize both the left white line LL and the right white line LR.

The condition B: the condition B is a condition established when a particular state has continued for a predetermined time period from a time point at which the specific recognition state occurred. The particular state is a state where the one side lane marker recognizable state is occurring and the specific recognition state does not occur.

It should be noted that the CPU may determine whether or not the above-described condition B is established in accordance with at least any one of the following method 1 and the following method 2.

The method 1: the CPU measures/calculates a duration time of the particular state from a time point at which the specific recognition state occurred. The CPU determines that the above-described condition B is established, when the measured duration time becomes equal to or longer than a threshold duration, The method 2: the CPU measures/calculates a traveling distance of the own vehicle SV under the above particular state from the time point at which the specific recognition state occurred. The CPU determines that the above-described condition B is established, when the measured traveling distance becomes equal to or longer than a threshold traveling distance.

When the cancellation condition is established, it can be determined that a steering state (angle) of the own vehicle becomes unlikely to abruptly/suddenly change after the specific recognition state occurred. Therefore, when the cancellation condition is established, the CPU makes a "Yes" determination at step 635 and proceeds to step 640 to set the value of the guard value limiting flag Xd to "0". Thereafter, the CPU proceeds to step 695 to tentatively terminate the present routine.

In contrast, when the cancellation condition is not established, the CPU makes a "No" determination at step 635 and proceeds directly to step 695 to terminate the present routine. As a result, the value of the guard value limiting flag Xd is maintained at "1".

It should be noted that when the lane keeping control is not being performed at a time point at which the process of the step 605 is executed, the CPU makes a "No" determination at step 605 to proceed to step 645, at which the CPU set the value of the guard limiting flag Xd to "0". Thereafter, the CPU proceeds to step 695 to tentatively terminate the present routine.

According to the above-described embodiment apparatus, the following effects are obtained. The embodiment apparatus is capable of reducing the possibility that the steering state (angle) of the own vehicle SV abruptly/suddenly changes when the specific recognition state occurs where the direction of the one recognizable white line with respect to the own vehicle SV changes from the left to the right or vice versa while only one of the left white line and the right white line has been able to be recognized. As a result, the embodiment apparatus can reduce the possibility that the traveling stability of the own vehicle is degraded.

MODIFIED EXAMPLES

Although the embodiment of the present invention has been specifically described above, the present invention is not limited to the above embodiment, and various modified examples based on the technical idea within the scope of the present invention can be adopted.

For example, although the embodiment apparatus detects the white lines by using the camera sensor 17, a method of detecting the white lines is not limited to this. For example, the modified example of the embodiment is provided with radar sensors (not shown) (e.g., laser radars) to detect the white lines using any one of the radar sensors.

One of the modified examples of the embodiment may estimate/infer the estimated/inferred lane width W1 according to a method different from the above-described method to thereby acquire the width W1. For example, one of the modified examples may estimate/infer the estimated/inferred lane width W1 based on the road information acquired from the map database 92 by the navigation ECU 90. Alternatively, for example, one of the modified examples may estimate/infer the estimated/inferred lane width W1 based on the road information acquired through performing the wireless communication with the roadside communication device installed on the road using the wireless communication device 101.

For example, one of the modified examples may be configured to limit the steering angle using the steering angle guard value without limiting the steering angle (the steering angle speed) using the steering angle speed guard value. Alternatively, one of the modified examples may be configured to omit the steering angle (the steering angle speed) using the steering angle speed guard value without limiting the steering angle using the steering angle guard value.

For example, one of the modified examples may set the steering angle guard value and the steering angle speed guard value to the following values depending on each of the lane marker recognition states of the DSECU.

When the lane marker recognition state of the DSECU is the "both lane markers recognizable state" and the value of the guard value limiting flag Xd is "0", the steering angle guard value is set to the first steering angle guard value, and the steering angle speed value is set to the first steering angle speed guard value.

This is the same as the operation of the above-described embodiment apparatus,

When the lane marker recognition state of the DSECU is the "one side lane marker recognizable state" and the value of the guard value limiting flag Xd is "1", the steering angle guard value is set to the second steering angle guard value, and the steering angle speed value is set to the second steering angle speed guard value.

This is also the same as the operation of the above-described embodiment apparatus.

When the lane marker recognition state of the DSECU is the "one side lane marker recognizable state" and the value of the guard value limiting flag Xd is "0", the steering angle guard value is set to a third steering angle guard value, and the steering angle speed value is set to a third steering angle speed guard value.

In the above case, it should be noted that the first steering angle guard value is equal to or larger than the third steering angle guard value, and the third steering angle guard value is larger than the second steering angle guard value (that is, the first steering angle guard value≥the third steering angle guard value>the second steering angle guard value), Similarly, the first steering angle speed guard value is equal to or larger than the third steering angle speed guard value, and the third steering angle speed guard value is larger than the second steering angle speed guard value (that is, the first steering angle speed guard value≥the third steering angle speed guard value>the second steering angle speed guard value).

For example, one of the modified examples may decrease only one of the steering angle guard value and the steering angle guard value at step 550 in FIG. 5.

For example, the target traveling line is not necessarily be the lane center line, as long as the target traveling line may be a line determined based on the left white line LL and the right white line LR. For example, the DSECU may set, as the target traveling line Ld, a line passing through positions apart from the "lane center line passing through midpoints between the left white line LL and the right white line LR" by a predetermined distance in the lane width direction. Such a method of setting the target traveling line Ld can be used regardless of whether the lane marker recognition state is the "both lane markers recognizable state" or the "one side lane marker recognizable state".

What is claimed is:

1. A vehicle traveling support apparatus comprising:
   a sensor for recognizing a lane marker on a traveling lane in which an own vehicle is traveling; and
   an electronic control unit configured to perform a lane keeping control to control a steering angle of said own vehicle so as to have said own vehicle travel along a target traveling line set based on at least any one of a left lane marker and a right lane marker recognized by said sensor, said left lane marker being on a left side with respect to said own vehicle, said right lane marker being on a right side with respect to said own vehicle,
   wherein,
   when performing said lane keeping control, said electronic control unit is configured to:
   execute at least any one of:
      (i) a process to control said steering angle so as to match a magnitude of said steering angle with a steering angle guard value when said magnitude of said steering angle exceeds said steering angle guard value; and
      (ii) a process to control said steering angle so as to match a magnitude of a steering angle speed which is an amount of change per unit time of said steering angle with a steering angle speed guard value when said magnitude of said steering angle speed exceeds said steering angle speed guard value; and
   set, when a recognition state of said lane marker by said sensor is a one side lane marker recognizable state which is a state where said sensor can recognize only one of said left lane marker and said right lane marker, a change amount of said steering angle and/or a change amount of said steering angle speed to a value which is smaller than when said recognition state of said lane marker is a both lane markers recognizable state which is a state where said sensor can recognize both said left lane marker and said right lane marker.

2. The vehicle traveling support apparatus according to claim 1,
   wherein,
   said electronic control unit is configured to set, when a specific recognition state occurs where said lane marker recognized by said sensor changes from said left lane marker to said right lane marker or vice versa under said one side lane marker recognizable state, said steering angle guard value and/or said steering angle speed guard value corresponding to one or more of said executed processes to a value which is smaller than when said recognition state of said lane marker is said one side lane marker recognizable state and said specific recognition state does not occur.

3. The vehicle traveling support apparatus according to claim 2,
   wherein,
   said electronic control unit is configured to set, when said specific recognition state has occurred after said own vehicle crossed said lane marker recognized by said sensor under said one side lane marker recognizable state, all of said steering angle guard value and said steering angle speed guard value to values of when said recognition state of said lane marker is said both lane markers recognizable state.

4. The vehicle traveling support apparatus according to claim 2,
   wherein,
   said electronic control unit is configured to set, when a particular state has continued for a predetermined period from a time point at which said specific recognition state occurred, said particular state being a state where said recognition state of said lane marker by said sensor is said one side lane marker recognizable state and said specific recognition state does not occur, said steering angle guard value and/or said steering angle speed guard value to a value which is larger than when said specific recognition state occurs and is smaller than when said recognition state of said lane marker by said sensor is said both lane markers recognizable state.

5. The vehicle traveling support apparatus according to claim 4,
   wherein,
   said electronic control unit is configured to determine that said particular state has continued for said predetermined period, when a duration time of said particular state from a time point at which said specific recognition state occurred becomes equal to or longer than a threshold duration time.

6. The vehicle traveling support apparatus according to claim 4,
   wherein,
   said electronic control unit is configured to determine that said particular state has continued for said predetermined period, when a traveling distance of said own vehicle under said particular state from a time point at which said specific recognition state occurred becomes equal to or longer than a threshold traveling distance.

7. The vehicle traveling support apparatus according to claim 1,
   wherein,
   said electronic control unit is configured to set, when a specific recognition state occurs where said lane marker recognized by said sensor changes from said left lane marker to said right lane marker or vice versa under said one side lane marker recognizable state, said change amount of said steering angle and/or said change amount of said steering angle speed to a value which is smaller than when said recognition state of said lane marker is said one side lane marker recognizable state and said specific recognition state does not occur.

8. The vehicle traveling support apparatus according to claim 7,
   wherein,
   said electronic control unit is configured to set, when said specific recognition state has occurred after said own vehicle crossed said lane marker recognized by said sensor under said one side lane marker recognizable state, all of said change amount of said steering angle and said change amount of said steering angle speed to values of when said recognition state of said lane marker is said both lane markers recognizable state.

9. The vehicle traveling support apparatus according to claim 7,
wherein,
said electronic control unit is configured to set, when a particular state has continued for a predetermined period from a time point at which said specific recognition state occurred, said particular state being a state where said recognition state of said lane marker by said sensor is said one side lane marker recognizable state and said specific recognition state does not occur, said change amount of said steering angle and/or said change amount of said steering angle speed to a value which is larger than when said specific recognition state occurs and is smaller than when said recognition state of said lane marker by said sensor is said both lane markers recognizable state.

10. A vehicle traveling support apparatus comprising:
a sensor for recognizing a lane marker on a traveling lane in which an own vehicle is traveling; and
an electronic control unit configured to perform a lane keeping control to control a steering angle of said own vehicle so as to have said own vehicle travel along a target traveling line set based on at least any one of a left lane marker and a right lane marker recognized by said sensor, said left lane marker being on a left side with respect to said own vehicle, said right lane marker being on a right side with respect to said own vehicle,
wherein, when performing said lane keeping control, said electronic control unit is configured to:
execute at least any one of:
(i) a process to control said steering angle so that a magnitude of said steering angle set when a change amount in the position of the target traveling line in the lane width direction is relatively large is larger than a magnitude of said steering angle set when a change amount in the position of the target traveling line in the lane width direction is relatively small; and
(ii) a process to control said steering angle so that a magnitude of a steering angle speed which is an amount of change per unit time of said steering angle set when a change amount in the position of the target traveling line in the lane width direction is relatively large is larger than a magnitude of said steering angle speed set when a change amount in the position of the target traveling line in the lane width direction is relatively small; and set, when a recognition state of said lane marker by said sensor is a one side lane marker recognizable state which is a state where said sensor can recognize only one of said left lane marker and said right lane marker, a change amount of said steering angle and/or a change amount of said steering angle speed to a value which is smaller than when said recognition state of said lane marker is a both lane markers recognizable state which is a state where said sensor can recognize both said left lane marker and said right lane marker.

11. A vehicle traveling support apparatus comprising:
a sensor for recognizing a lane marker on a traveling lane in which an own vehicle is traveling; and
an electronic control unit configured to perform a lane keeping control to control a steering angle of said own vehicle so as to have said own vehicle travel along a target traveling line set based on at least any one of a left lane marker and a right lane marker recognized by said sensor, said left lane marker being on a left side with respect to said own vehicle, said right lane marker being on a right side with respect to said own vehicle,
wherein, when performing said lane keeping control, said electronic control unit is configured to:
execute at least any one of:
(i) a process to control said steering angle so as to match a magnitude of said steering angle with a steering angle guard value when said magnitude of said steering angle exceeds said steering angle guard value; and
(ii) a process to control said steering angle so as to match a magnitude of a steering angle speed which is an amount of change per unit time of said steering angle with a steering angle speed guard value when said magnitude of said steering angle speed exceeds said steering angle speed guard value; and
set, when a specific recognition state occurs where said lane marker recognized by said sensor changes from said left lane marker to said right lane marker or vice versa under one side lane marker recognizable state which is a state where said sensor can recognize only one of said left lane marker and said right lane marker, a change amount of said steering angle and/or a change amount of said steering angle speed to a value which is smaller than when said recognition state of said lane marker is said one side lane marker recognizable state and said specific recognition state does not occur.

* * * * *